United States Patent
Shah et al.

(10) Patent No.: US 6,745,033 B1
(45) Date of Patent: Jun. 1, 2004

(54) METHOD OF OPTIMIZING HANDOFF HYSTERESIS VALUES IN A CELLULAR TELECOMMUNICATIONS NETWORK

(75) Inventors: Ali Shah, Plano, TX (US); Hossam Hmimy, Plano, TX (US)

(73) Assignee: Ericsson Inc., Plano, TX (US)

( * ) Notice: Subject to any disclaimer, the term of this patent is extended or adjusted under 35 U.S.C. 154(b) by 224 days.

(21) Appl. No.: 10/165,251

(22) Filed: Jun. 7, 2002

(51) Int. Cl.$^7$ ................................................ H04Q 7/20
(52) U.S. Cl. ........................ 455/436; 455/437; 455/438; 455/440; 370/332; 370/333
(58) Field of Search ................................. 455/436, 437, 455/438, 439, 440, 441, 442, 67.11, 67.13, 226.1, 226.2, 226.3; 370/331, 332, 333, 334, 328

(56) References Cited

U.S. PATENT DOCUMENTS

| 5,995,836 A | 11/1999 | Wijk et al. ................... 455/436 |
| 6,285,883 B1 | 9/2001 | Bringby et al. .............. 455/437 |

FOREIGN PATENT DOCUMENTS

| WO | WO 00/16578 | 3/2000 |

OTHER PUBLICATIONS

Senadji B et al: "Estimation of the Hysteresis Value for Handover Decision Algorithms Using Bayes Criterion" Proceedings of ICICS. International Conference on Information Communications and Signal Processing, XX, XX, pp. 1771–1775, XP002076868 the whole document.

*Primary Examiner*—Erika Gary
*Assistant Examiner*—Temica M. Davis

(57) ABSTRACT

A method in a cellular telecommunications network for optimizing a current hysteresis value utilized to define a handoff border between a present cell and a neighbor cell. Pairs of signal strength (SS) measurements are collected from a plurality of mobile stations operating near the handoff border. Each SS measurement pair includes an SS measurement from the present cell and an SS measurement from the neighbor cell. A midpoint SS is then calculated by determining an average SS measurement from the present cell, an average SS measurement from the neighbor cell, and an overall average of the average SS measurement from the present cell and the average SS measurement from the neighbor cell. The method then optimizes the handoff border by subtracting from the current hysteresis value, an amount approximately equal to the difference between the midpoint SS and the average SS measurement from the present cell.

10 Claims, 2 Drawing Sheets

METHOD OF OPTIMIZING HANDOFF HYSTERESIS VALUES IN A CELLULAR TELECOMMUNICATIONS NETWORK

BACKGROUND OF THE INVENTION

1. Technical Field of the Invention

This invention relates to telecommunication systems. More particularly, and not by way of limitation, the present invention is directed to a method of optimizing hysteresis values utilized for automated handoff of mobile stations operating in a cellular radio telecommunications network.

2. Description of Related Art

In cellular radio telecommunications networks, as a mobile station (MS) moves away from its serving base station, the received signal strength at the MS decreases while the received signal strength from a neighbor cell increases. Eventually, when the signal strength from the neighbor cell exceeds the signal strength from the serving cell, a handoff is performed. Under certain circumstances, the MS may be undesirably handed off back and forth in a fairly rapid manner between two or more cells. This phenomenon is known as handoff oscillations, and has many adverse effects in the cellular network. First, temporary muting is experienced by the subscriber during each handoff, and this adversely affects voice quality when it is repeatedly experienced in a short period of time. Second, the probability of dropping the call is cumulatively increased since the probability of dropping a call is increased during each handoff. Third, the repeated handoffs add to the processor load in the network.

One of the main causes of handoff oscillations is the manner in which MSs obtain signal strength measurements from the serving cell and candidate neighboring cells. Erroneous signal strength measurements from neighbor cells can be caused by a design defect in certain MSs, by poor cell planning causing co-channel interference, or poor propagation in certain areas. In general, the received signal strength decreases in a log-normal fashion as the MS recedes from the serving base station. Variations in the received signal strength are superimposed on the log-normal decrease. These variations may be caused by multi-path constructive and destructive interference (long-term fading) and Rayleigh (short-term) fading.

Due to the signal strength variations, MSs often do not report signal strengths that are proportional solely to the MSs' distances from the serving base station and neighboring base stations. The variations may make the signal strength from the neighboring base station appear better than the MS's position would dictate, and better than the signal strength in the serving cell. The handoff is then performed based on the erroneous measurements. This places the MS in a new serving cell where the measurements then show that the signal strength is better in the old serving cell. Therefore, another handoff is performed back to the old serving cell.

In previous solutions to the handoff oscillation problem, an automated hysteresis value is calculated and utilized to control the rate of oscillating handoffs. The hysteresis value may be calculated for a particular cell based on the standard deviation of the received signal strength reported by, or oscillation rate experienced by, an MS in the cell. In order for an outgoing handoff to be performed, the received signal strength from a candidate neighbor cell must exceed the signal strength of the serving cell by the hysteresis amount. Once the MS is handed off, the application of the hysteresis value is reversed, and the signal strength from the original serving cell must exceed the signal strength of the new serving cell by the hysteresis amount before a handoff back will be performed. A hysteresis margin may be added to the normal hysteresis value to reduce the probability that the MS will be handed off back to the original serving cell.

However, every MS is affected in the particular cell when the automated hysteresis value is determined and set. If the hysteresis value is not optimized, the network's handoff performance is adversely affected. For MSs experiencing severe handoff oscillation problems, this trade-off may be acceptable. However, all MSs are not uniformly affected by oscillating handoffs. This creates unbalanced handoff borders and excessive interference, requiring that the value of the hysteresis be set higher, thereby further degrading handoff performance for all MSs in the cell.

In order to overcome the disadvantage of existing solutions, it would be advantageous to have a method of optimizing the automated hysteresis value in a cellular network. The present invention provides such a system and method.

SUMMARY OF THE INVENTION

In one aspect, the present invention is directed to a method in a cellular telecommunications network for optimizing a handoff border between a present cell and a neighbor cell. The method optimizes a current hysteresis value utilized to ensure that a mobile station (MS) is receiving a stronger signal from the neighbor cell than the present cell before a handoff is performed from the present cell to the neighbor cell. Pairs of signal strength (SS) measurements are collected from a plurality of MSs operating near the handoff border. Each SS measurement pair includes an SS measurement from the present cell prior to a handoff and an SS measurement from the neighbor cell following the handoff. A midpoint SS is then calculated by determining an average SS measurement from the present cell, an average SS measurement from the neighbor cell, and an overall average of the average SS measurement from the present cell and the average SS measurement from the neighbor cell. The method then optimizes the handoff border by subtracting from the current hysteresis value, an amount approximately equal to the difference between the midpoint SS and the average SS measurement from the present cell.

In another aspect, the present invention is directed to a method of optimizing an outgoing hysteresis value utilized for controlling handoff of an MS from a present cell to a neighbor cell at a handoff border in a cellular telecommunications network. The method includes the steps of determining a current outgoing hysteresis value, and collecting a plurality of SS measurements taken by a plurality of MSs operating near the handoff border. The SS measurements include, for each mobile station, a first SS measurement of a signal received by the mobile station from a first base station serving the present cell, and a second SS measurement of a signal received by the mobile station from a second base station serving the neighbor cell. The SS measurements are then utilized to calculate an average SS on the present cell side of the handoff border (CP), and an average SS on the neighbor cell side of the handoff border (CN). A midpoint SS between the present cell and the neighbor cell is then calculated by calculating an average of CP and CN. Next, an expected signal strength on the present cell side of the handoff border following the handoff (EP) is calculated by subtracting a factor due to rounding errors from the midpoint SS. Finally, a recommended hysteresis value for outgoing handoffs from the present cell to the neighbor cell is calculated by subtracting from the current outgoing hysteresis value, the difference between EP and CP.

In yet another aspect, the present invention is directed to a method in a cellular telecommunications network for optimizing an incoming hysteresis value utilized for controlling handoff of a mobile station from a neighbor cell to a present cell at a handoff border. The method includes the steps of determining a current incoming hysteresis value, and collecting a plurality of SS measurements taken by a plurality of MSs operating near the handoff border. The SS measurements include, for each mobile station, a first SS measurement of a signal received by the mobile station from a first base station serving the present cell, and a second SS measurement of a signal received by the mobile station from a second base station serving the neighbor cell. The SS measurements are then utilized to calculate an average SS on the present cell side of the handoff border (CP), and an average SS on the neighbor cell side of the handoff border (CN). A midpoint SS between the present cell and the neighbor cell is then calculated by calculating an average of CP and CN. Next, an expected signal strength on the neighbor cell side of the handoff border following the handoff (EN) is calculated by adding a factor due to rounding errors, and adding an MS output-power step-size factor to the midpoint SS. Finally, a recommended hysteresis value for incoming handoffs from the neighbor cell to the present cell is calculated by subtracting from the current incoming hysteresis value, the difference between EN and CN.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method that optimizes the handoff border for a cell in a cellular telecommunications network by optimizing a Signal Strength Hysteresis (SSHY) value utilized to determine when a handoff to or from a neighbor cell is warranted. Abbreviations utilized herein are defined as follows:

SSHY: signal strength hysteresis;
CP: current signal strength (SS) before the handoff on the present cell side of a handoff border;
CN: current SS before the handoff on the neighbor cell side of a handoff border;
SSHY_CH: current SSHY for an outgoing handoff for the border;
SSHY_RH: recommended SSHY for an outgoing handoff for the border;
SSHY_CI: current SSHY for an incoming handoff for the border;
SSHY_RI: recommended SSHY for an incoming handoff for the border;
EP: expected SS following the handoff on the present cell side of a handoff border;
EN: expected SS following the handoff on the neighbor cell side of a handoff border;
$W_{SS}$: a settable threshold defining weak signal strength—typically around −100 dBm;
CWSS (%): current percentage of SS←$W_{SS}$ dBm in the cell;
EWSS (%): expected percentage of SS←$W_{SS}$ dBm in the cell;
Midpoint_SS: signal strength equality point between the present cell and neighbor cell.

Figure 1A:
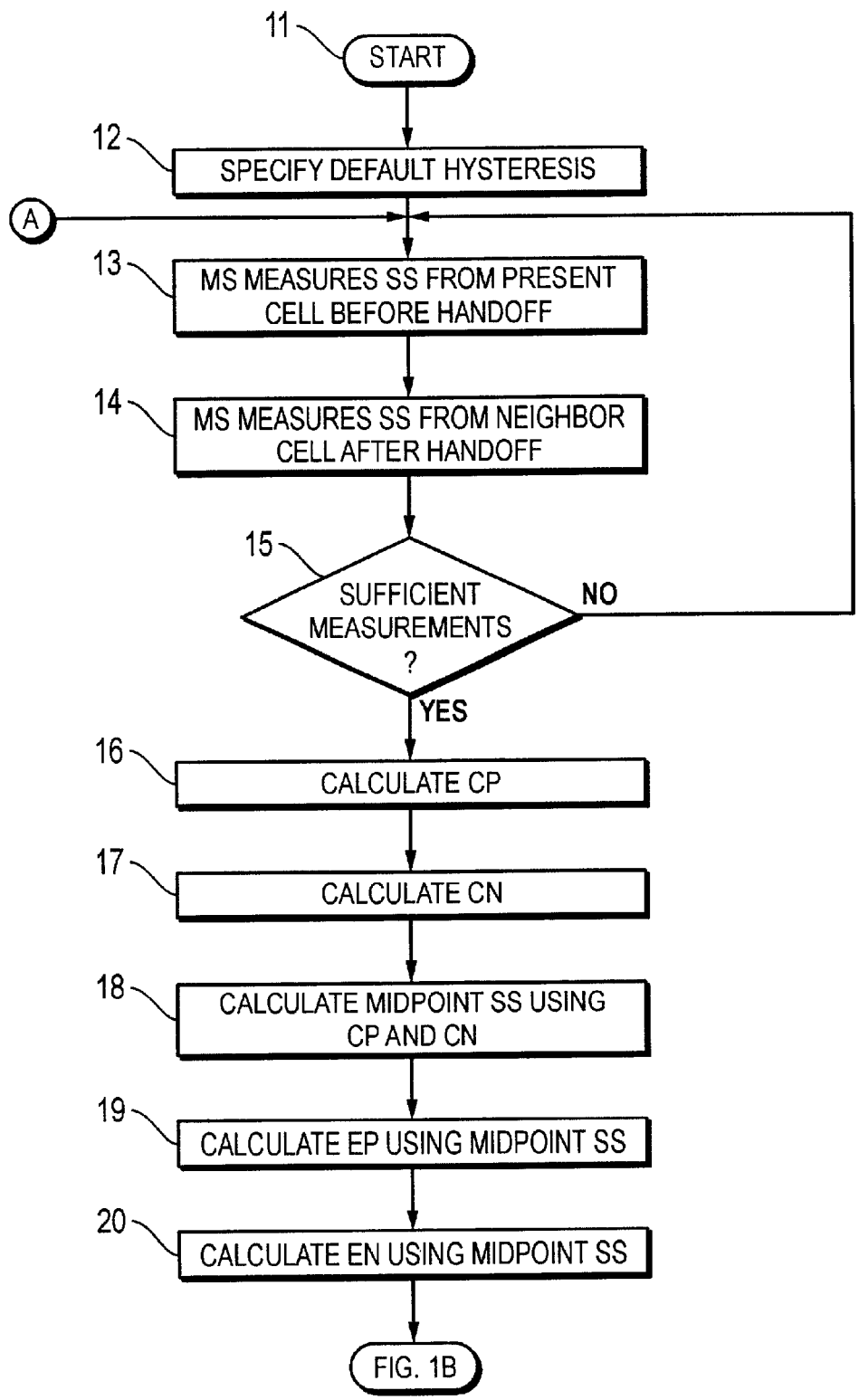
FIGS. 1A and 1B are portions of a flow chart illustrating the steps of the preferred embodiment of the method of the present invention for optimizing hysteresis values for a given cell.
Figure 1B:
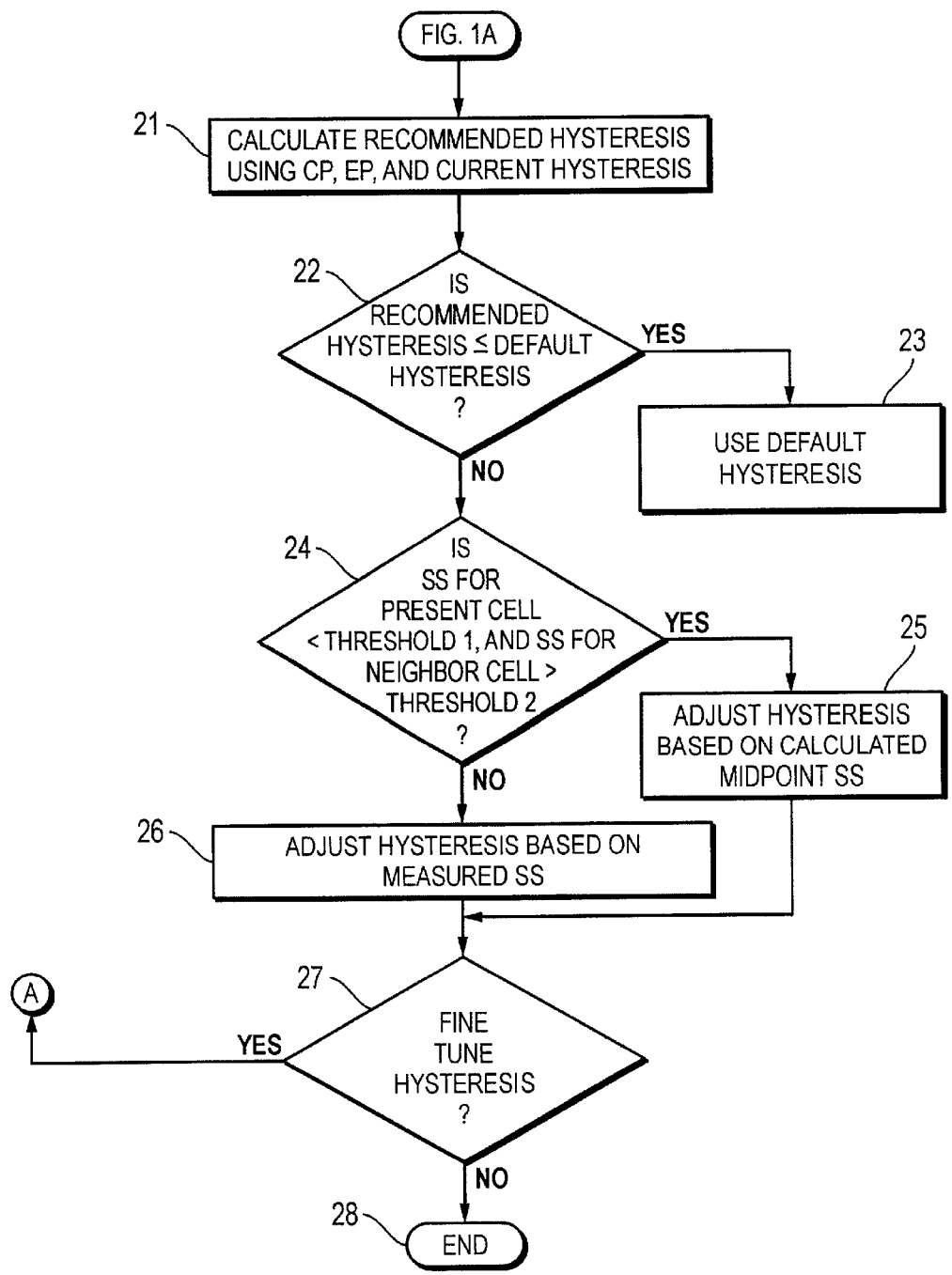

FIGS. 1A and 1B are portions of a flow chart illustrating the steps of the preferred embodiment of the method of the present invention for optimizing hysteresis values for a given cell. The method utilizes signal strength measurements obtained from all of the MSs in the cell via the Mobile Switching Center (MSC) or Base Station Controller (BSC). Based on these measurements, a midpoint algorithm optimizes the handoff border by calculating the best possible hysteresis values for outgoing and incoming handoffs. The method may also modify the calculated hysteresis values in order to balance the traffic load in each cell, or to delay handoffs due to low handoff effectiveness as a result of congestion or interference.

The method starts at FIG. 1A, step 11 and proceeds to step 12 where default hysteresis values are specified for the cell for outgoing and incoming handoffs, if current hysteresis values have not already been established. At step 13, the MS measures the signal strength received from the present (serving) cell before a handoff is commenced. At step 14, the MS measures the signal strength received from the target neighbor cell (new serving cell) after the handoff is completed. This process is repeated until measurements have been obtained from a predefined threshold number of MSs for each present cell/neighbor cell pair, or from all of the MSs in the cell. Statistically, this may require measurements from 30 or more MSs, although favorable results may be obtained from fewer MSs. Thus, at step 15, it is determined whether or not measurements have been obtained from a sufficient number of MSs per present cell/neighbor cell pair. If not, the process returns to step 13 and obtains additional measurements.

However, if measurements have been obtained from a sufficient number of MSs, the method proceeds to step 16 where CP is first calculated by averaging the signal strength measurements taken in the present cell before the handoff for each present cell/neighbor cell pair. CN is likewise calculated at step 17 by averaging the signal strength measurements taken in the neighbor cell after the handoff for each present cell/neighbor cell pair. At step 18, the CP and CN are then used to calculate the midpoint_SS (the point of equality between the present cell and the neighbor cell) utilizing the equation:

$$midpoint\_SS=(CP+CN)/2$$

At step 19, the expected SS on the present cell side of the handoff border (EP) is then calculated utilizing the equation:

$$EP=midpoint\_SS-\gamma$$

where γ is an adjustment factor that accounts for rounding errors.

At step 20, the expected SS on the neighbor cell side of the handoff border (EN) is then calculated utilizing the equation:

$$EN=midpoint\_SS+\gamma+\delta$$

where δ is the step size of the MS output power (typically about 4 dB). An adjustment in the calculation of EN may be utilized for digital traffic in order to include the effective radiated power (ERP) between the present cell and the neighbor cell.

The method then moves to FIG. 1B, step 21, where the recommended hysteresis value for outgoing handoffs (SSHY_RH) is then calculated by modifying the current hysteresis value for outgoing handoffs (SSHY_CH) utilizing the equation:

$$SSHY\_RH = SSHY\_CH - (EP-CP)$$

Likewise, the recommended hysteresis value for incoming handoffs (SSHY_RI) is then calculated by modifying the current hysteresis value for incoming handoffs (SSHY_CI) utilizing the equation:

$$SSHY\_RI = SSHY\_CI - (EN-CN)$$

At step 22, it is determined whether the recommended hysteresis values are less than or equal to the default hysteresis values. If so, the method moves to step 23 where the default hysteresis values are utilized. If the recommended hysteresis values are greater than the default hysteresis values, the method moves to step 24 where it is determined whether the signal strength for the present cell at the time of the handoff attempt is weak (for example, below a first threshold such as Wss=−99 dBm), and the signal strength for the neighboring cell is strong (for example, above a second threshold such as −94 dBm). If so, the method moves to step 25 where the hysteresis values are adjusted in accordance with the calculated midpoint$_{13}$ SS. If not, the method moves to step 26 where the hysteresis values are adjusted based on the measured signal strength.

At step 27, it is determined whether the recommended hysteresis values are to be fine tuned. If so, the method returns to step 11 and starts again utilizing additional signal strength data from MSs for each present cell/neighbor cell pair, or from all of the MSs in the cell. The hysteresis values may be periodically updated by repeating the steps of the method utilizing the most recent SS measurements from MSs in the present cell. If the hysteresis values are not to be fine tuned, the method ends at step 28.

EXAMPLE HYSTERESIS OPTIMIZATION

Table 1 below is an exemplary table of values for the various factors that are utilized to calculate the optimal hysteresis value.

SSHY_CI=3 dB.

The midpoint (CP+CN)/2 would be:

Midpoint_SS=−101 dBm (rounded to the nearest integer).

The expected signal strength on the present cell side of the handoff border (EP) is then midpoint_SS−γ. If the adjustment factor for rounding errors (γ)=1, then:

EP=−101−1=−102 dBm.

The expected signal strength on the neighbor cell side of a handoff border (EN) is then midpoint_SS+γ+δ:

EN=−101+1+4=−96 dBm.

Based on the signal strength measurements, the recommended hysteresis for outgoing handoffs (SSHY_RH) would be:

$$\begin{aligned} SSHY\_RH &= SSHY\_CH - (EP-CP) \\ &= 3 - (-102 + 108) \\ &= 3 - 6 \\ &= -3 \text{ dB.} \end{aligned}$$

Based on the signal strength measurements, the recommended hysteresis for incoming handoffs (SSHY_RI) would be:

$$\begin{aligned} SSHY\_RI &= SSHY\_CI - (EN-CN) \\ &= 3 - (-96 + 91) \\ &= 3 + 5 \\ &= 8 \text{ dB.} \end{aligned}$$

Thus, for outgoing handoffs, the current hysteresis (SSHY$_{CH}$) is 3 dB. On the other hand, the handoff occurs at −108 dBm (for present cell) and −91 dBm (for neighbor cell). The recommended hysteresis for an outgoing handoff for the border (SSHY_RH) is −2 dB. In other words, the handoff should occur 5 dB earlier, and therefore, the expected signal strength before handoff should be −103 dBm.

Similarly for incoming handoffs, the current hysteresis (SSHY_CI) is 3 dB, while the recommended hysteresis for an incoming handoff for the border (SSHY_RI) is 5 dB greater (i.e., 8 dB). As a result, the current signal strength

TABLE 1

| CELL | NCELL | CP/CN (dBm) | SSHY_CH/ SSHY_RH (dB) | SSHY_CI/ SSHY_RI (dB) | EP/EN (dBm) | CWSS (%) | EWSS (%) | DT (%) |
|---|---|---|---|---|---|---|---|---|
| C031 | C071 | −108/−91 | 3/−3 | 3/8 | −103/−96 | 5.8 | 5.8 | 1.0 |

The table presents one iteration of the "midpoint algorithm", which may be fine tuned as additional signal strength measurements are obtained. The handoff border is changed to a point where the MS gets equal average power from both base stations, adjusted by a hysteresis. As shown, the measured signal strength in the present cell (CP) on one side of the border, and the neighbor cell (CN) on the other side of the border are:

CP=−108 dBm

CN=−91 dBm.

The current hysteresis for outgoing handoff to the neighbor cell (SSHY_CH) and the current hysteresis for incoming handoff from the neighbor cell (SSHY_CI) are:

before handoff (CN) should decrease from −91 dBm to −96 dBm. The result is that the handoff borders are more uniform based on received signal strength.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method in a cellular telecommunications network of optimizing a handoff border between a present cell and a neighbor cell, said method comprising the steps of:

determining a current hysteresis value utilized to ensure that a mobile station (MS) is receiving a stronger signal from the neighbor cell than the present cell before a handoff is performed from the present cell to the neighbor cell, said stronger signal being stronger by the hysteresis value;

collecting pairs of signal strength (SS) measurements from a plurality of MSs operating near the handoff border, each SS measurement pair including an SS measurement from the present cell prior to a handoff and an SS measurement from the neighbor cell following the handoff;

calculating a midpoint SS by determining an average SS measurement from the present cell, an average SS measurement from the neighbor cell, and an overall average of the average SS measurement from the present cell and the average SS measurement from the neighbor cell; and optimizing the handoff border by subtracting from the current hysteresis value, an amount approximately equal to the difference between the midpoint SS and the average SS measurement from the present cell.

2. The method of optimizing a handoff border of claim 1 further comprising repeating the steps of claim 1 utilizing SS measurements from a greater number of MSs.

3. A method in a cellular telecommunications network of optimizing an outgoing hysteresis value utilized for controlling handoff of a mobile station from a present cell to a neighbor cell at a handoff border, said method comprising the steps of:

determining a current outgoing hysteresis value;

collecting a plurality of signal strength (SS) measurements taken by a plurality of mobile stations operating near the handoff border, said SS measurements including, for each mobile station, a first SS measurement of a signal received by the mobile station from a first base station serving the present cell prior to a handoff, and a second SS measurement of a signal received by the mobile station from a second base station serving the neighbor cell following the handoff;

calculating an average SS on the present cell side of the handoff border (CP);

calculating an average SS on the neighbor cell side of the handoff border (CN);

calculating a midpoint SS between the present cell and the neighbor cell by calculating an average of CP and CN;

calculating an expected signal strength on the present cell side of the handoff border following the handoff (EP) by subtracting a factor due to rounding errors from the midpoint SS; and calculating a recommended hysteresis value for outgoing handoffs from the present cell to the neighbor cell by subtracting from the current outgoing hysteresis value, the difference between EP and CP.

4. The method of optimizing an outgoing hysteresis value of claim 3 further comprising updating the outgoing hysteresis value by repeating the steps of claim 1 utilizing the most recent SS measurements from MSs in the present cell.

5. The method of optimizing an outgoing hysteresis value of claim 3 further comprising fine tuning the outgoing hysteresis value by repeating the steps of claim 1 utilizing SS measurements from all of the MSs operating in the present cell.

6. The method of optimizing an outgoing hysteresis value of claim 3 further comprising the steps of:

determining whether the recommended hysteresis value is less than or equal to a default hysteresis value; and upon determining that the recommended hysteresis value is less than or equal to the default hysteresis value, utilizing the default hysteresis value to control handoffs.

7. The method of optimizing an outgoing hysteresis value of claim 3 further comprising the steps of:

determining whether the SS for the present cell is below a predefined threshold for weak signal strength while the SS for the neighbor cell is above a predefined threshold for strong signal strength; and adjusting the current hysteresis value based on the calculated midpoint SS, upon determining that the SS for the present cell is below the weak SS threshold and the SS for the neighbor cell is above the strong SS threshold.

8. The method of optimizing an outgoing hysteresis value of claim 7 further comprising adjusting the current hysteresis value based on the measured SS, upon determining that either the SS for the present cell is above the weak SS threshold or the SS for the neighbor cell is below the strong SS threshold.

9. A method in a cellular telecommunications network of optimizing an incoming hysteresis value utilized for controlling handoff of a mobile station from a neighbor cell to a present cell at a handoff border, said method comprising the steps of:

determining a current incoming hysteresis value;

collecting a plurality of signal strength (SS) measurements taken by a plurality of mobile stations operating near the handoff border, said SS measurements including, for each mobile station, a first SS measurement of a signal received by the mobile station from a first base station serving the present cell prior to a handoff, and a second SS measurement of a signal received by the mobile station from a second base station serving the neighbor cell following the handoff;

calculating an average SS on the present cell side of the handoff border (CP);

calculating an average SS on the neighbor cell side of the handoff border (CN);

calculating a midpoint SS between the present cell and the neighbor cell by calculating an average of CP and CN;

calculating an expected signal strength on the neighbor cell side of the handoff border following the handoff (EN) by adding a factor due to rounding errors, and adding an MS output-power step-size factor to the midpoint SS; and calculating a recommended hysteresis value for incoming handoffs from the neighbor cell to the present cell by subtracting from the current incoming hysteresis value, the difference between EN and CN.

10. A method in a cellular telecommunications network of optimizing outgoing and incoming hysteresis values utilized for controlling when a mobile station is handed off between a present cell and a neighbor cell at a handoff border, said method comprising the steps of:

determining a current outgoing hysteresis value;

determining a current incoming hysteresis value;

collecting a plurality of signal strength (SS) measurements taken by a plurality of mobile stations operating near the handoff border, said SS measurements including, for each mobile station, a first SS measurement of a signal received by the mobile station from a first base station serving the present cell prior to a handoff, and a second SS measurement of a signal received by the mobile station from a second base station serving the neighbor cell following the handoff;

calculating an average SS on the present cell side of the handoff border (CP);

calculating an average SS on the neighbor cell side of the handoff border (CN);

calculating a midpoint SS between the present cell and the neighbor cell by calculating an average of CP and CN;

calculating an expected signal strength on the present cell side of the handoff border following the handoff (EP) by subtracting a factor due to rounding errors from the midpoint SS;

calculating an expected signal strength on the neighbor cell side of the handoff border following the handoff (EN) by adding the factor due to rounding errors, and adding an MS output-power step-size factor, to the midpoint SS;

calculating a recommended hysteresis value for outgoing handoffs from the present cell to the neighbor cell by subtracting from the current outgoing hysteresis value, the difference between EP and CP; and calculating a recommended hysteresis value for incoming handoffs from the neighbor cell to the present cell by subtracting from the current incoming hysteresis value, the difference between EN and CN.

* * * * *